United States Patent [19]

Skinner

[11] Patent Number: 5,180,196
[45] Date of Patent: Jan. 19, 1993

[54] METHOD OF INSTALLING A RIBBED SLEEVE GASKET ADAPTER

[75] Inventor: James W. Skinner, Fort Wayne, Ind.

[73] Assignee: Press-Seal Gasket Corporation, Fort Wayne, Ind.

[21] Appl. No.: 702,332

[22] Filed: May 20, 1991

[51] Int. Cl.⁵ .............................. F16L 21/02
[52] U.S. Cl. ................... 285/253; 285/903; 29/505; 29/508
[58] Field of Search ......... 285/921, 903, 253; 29/437, 457, 505, 508, 518, 571

[56] References Cited

U.S. PATENT DOCUMENTS

| | | | |
|---|---|---|---|
| 3,565,464 | 2/1971 | Wolf | 285/903 |
| 3,785,682 | 1/1974 | Schaller et al. | 285/921 |
| 4,141,576 | 2/1979 | Lupke et al. | 285/903 |
| 4,171,834 | 10/1979 | Abner | 285/921 |
| 4,702,502 | 10/1987 | Shade et al. | 285/903 |
| 4,795,197 | 1/1989 | Kaminski et al. | 285/903 |
| 4,871,198 | 10/1989 | Hattori et al. | 285/903 |
| 5,072,972 | 12/1991 | Justice | 285/373 |

FOREIGN PATENT DOCUMENTS 610080  3/1979  Switzerland ............ 285/903

Primary Examiner—Eric K. Nicholson
Attorney, Agent, or Firm—Pearne, Gordon, McCoy & Granger

[57] ABSTRACT

A gasket adapter for providing a sealing surface on a ribbed conduit is disclosed. The adapter is fabricated from an elastomeric material and includes a smooth, cylindrical outer surface adapter to mate with a conventional gasket employed between an opening and a conduit, or between aligned conduits. The inner surface of the adapter comprises a series of peaks and valleys which are adapted to nest with the peaks and valleys of a conduit surface. The adapter is initially fabricated with its cylindrical surface as its inside surface so that the adapter may be installed on the ribbed conduit and then inverted to provide the smooth outer sealing surface.

1 Claim, 4 Drawing Sheets

METHOD OF INSTALLING A RIBBED SLEEVE GASKET ADAPTER

BACKGROUND OF THE INVENTION

This invention relates to sleeve gaskets for pipes and, more particularly, to adapters for providing a smooth sealing surface on a pipe which has external reinforcing ribs so that the surface of the pipe comprises a multiplicity of peaks and valleys.

Fluid conduits and, more particularly, sewer pipe, have been made from concrete. In recent years, there have been proposals to replace such concrete conduits with plastics due to the improved physical characteristics of plastic and the desirable strength-to-weight ratio compared to concrete. A major drawback in employing plastic conduit as a substitute for concrete is the cost of the plastic, particularly when employing smooth-walled plastic tubing as a substitute for smooth-walled concrete tubing having equivalent mechanical strength.

While corrugated tubing offers increased stiffness in the tube wall, the corrugated interior of the pipe presents undesirable flow characteristics within the conduit. An acceptable plastic conduit having desirable strength-to-weight ratios and acceptable cost factors is plastic tubing having a smooth-walled interior with external projecting reinforcing ribs which provide desirable hoop strength characteristics to the tubing and which do not add materially to the weight or cost of the conduit. Since pipe joint sealing gaskets are designed to provide a fluidtight joint between smooth-walled conduits and openings in rigid concrete structures, such as a manhole, a pipe section, a septic tank, or the like, the conventional sealing gaskets cannot perform their sealing function with respect to a ribbed conduit.

SUMMARY OF THE INVENTION

This invention provides a gasket adapter for providing a smooth, cylindrical sealing surface on a ribbed conduit which will enable use of conventional sealing gaskets between the conduit and openings in concrete or other structures and which will enable use of conventional coupling members to join ribbed conduits in an end-to-end fashion. According to this invention, a gasket adapter has a smooth, cylindrical outer surface and tapered end portions which facilitate the use of the adapter in jab-joint connections. A particularly advantageous feature of this invention is that the adapter is symmetrical about a plane bisecting its central axis so that the adapter cannot be mounted on a ribbed conduit improperly. The beveled edges of the adapter provide for compression of both the adapter and the gasket in the opening to be gradually increased during insertion of the pipe.

The gasket adapter is provided with an inner surface having a plurality of peaks and valleys which substantially complement the shape of the peaks and valleys of the ribbed conduit along the axial extent of the portion of the pipe to be sealed. These peaks and valleys are in the form of axially spaced semitoroidal lobes which add rigidity to the outer cylindrical surface of the adapter.

The gasket adapter according to this invention is manufactured by conventional extrusion techniques from suitable elastomeric material. The extrusion is vulcanized and cut to predetermined lengths, and each length is fused or cemented end-to-end to form a tubular configuration. The gasket adapter may also be manufactured by compression or injection molding techniques.

The adapters are formed with the smooth cylindrical surface inside, with the internal diameter of the adapter being slightly less than the diameter of the ribs on the conduit. Each adapter is then axially fitted onto the conduit with a slight interference fit and in a location which is axially offset from the desired final position of the adapter. Since the beveled ends of the adapter are initially located on the inside of the adapter and flare from the inside cylindrical surface, those portions facilitate the initial placement of hte adapter on the conduit. To properly position the adapter for use with a conventional gasket seal, the adapter is turned inside-out from its initial form so that the circumferential lobes enter the spaces between the ribs on the conduit. This operation may be accomplished in the field by the installation crew. It may also be advantageous to have the adapters mounted in their preinverted positions on the conduit during shipment to the job site to prevent the conduit from abrasion damage.

DETAILED DESCRIPTION OF THE INVENTION

Figure 1:
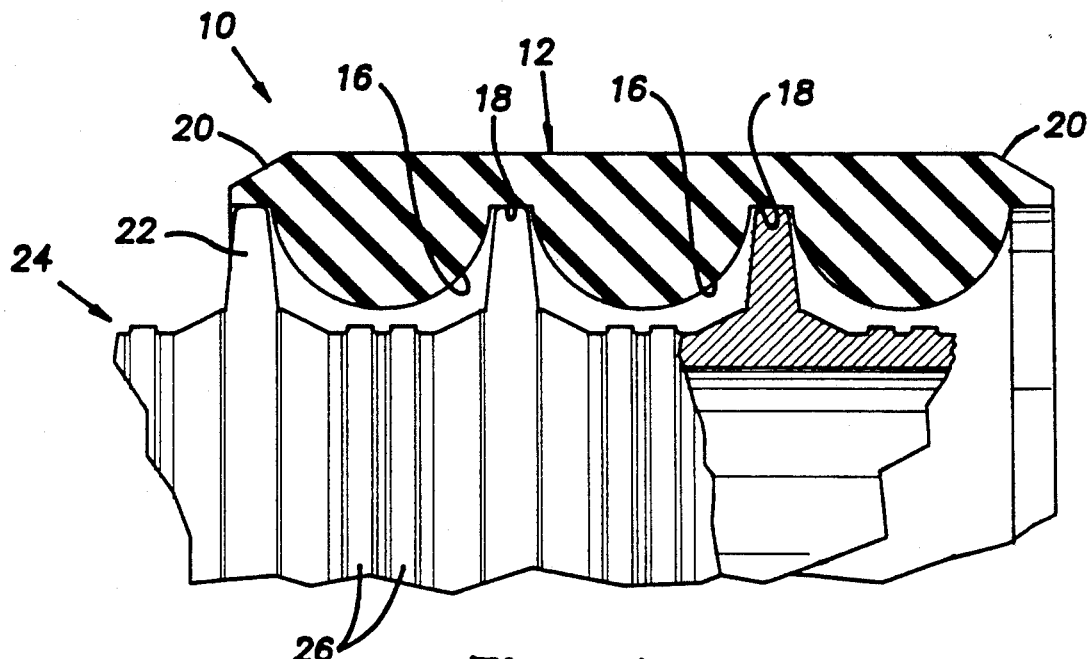
FIG. 1 is a fragmentary, cross-sectional view of a gasket adapter mounted on a conduit in its operative position for receiving a sealing gasket.
Figure 2:
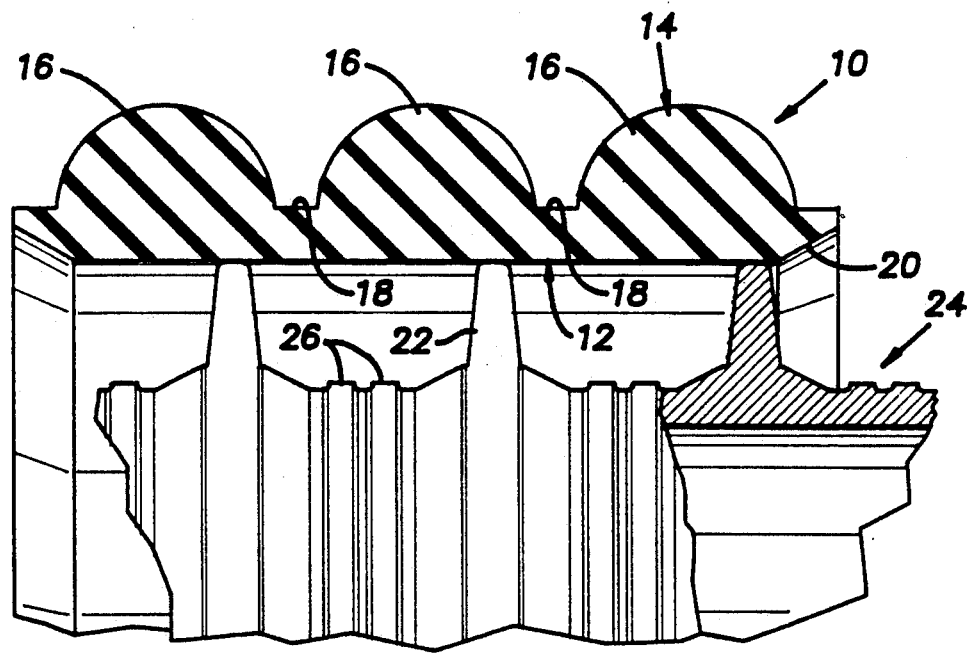
FIG. 2 is a fragmentary, cross-sectional illustration of the sealing gasket in a preliminarily mounted position on the conduit.
Figure 3:
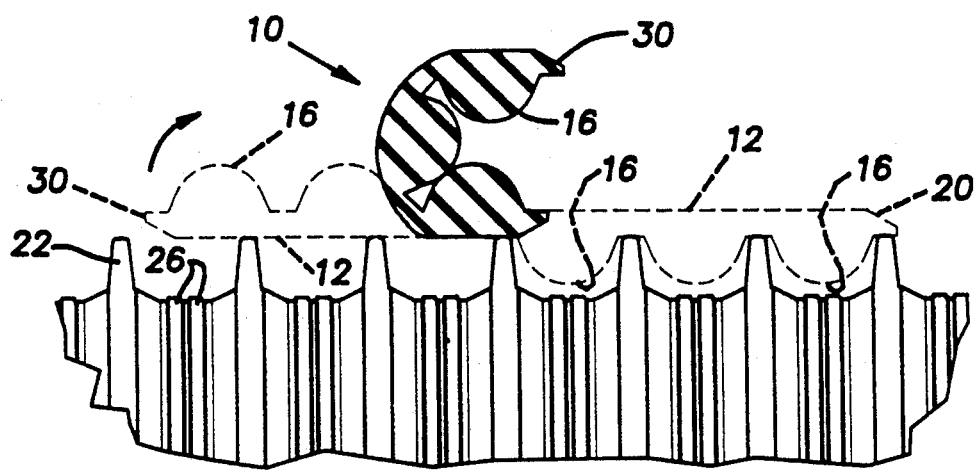
FIG. 3 is a fragmentary, cross-sectional view of an adapter being inverted to its operative position from the position illustrated in FIG. 2 to the position illustrated in FIG. 1.

Referring now to the drawings, and particularly to FIGS. 1 through 3, there is illustrated a gasket adapter 10 according to this invention. The adapter 10 is extruded from an elastomeric material, and is joined at its ends to form a cylindrical sleeve configuration having a smooth, cylindrical surface 12 and an opposite surface 14 having a series of semitoroidal protuberances 16. The protuberances 16 are axially spaced by cylindrical sealing surfaces 18. The ends of the adapter 10 are defined by frustoconical beveled edges 20.

The ends of a flat length of extruded, elastomeric material are cut to a predetermined length and formed into a cylinder, with the smooth cylindrical surface 12 constituting the interior surface of the adapter 10 as originally manufactured. The length of the extrusion is determined so that the circumferential extent of the surface 12 defines a diameter which is slightly less than the diameter of the ribs on a conduit to which the adapter is applied.

Referring particularly to FIG. 2. the inside diameter of the surface 12 is slightly less than the outside diameter of radially projecting ribs 22 on a length of plastic conduit 24. The conduit 24 illustrated herein is conduit produced by Extrusion Technologies, Inc., of Roswell, Ga., and marketed under the trademark ULTRARIB in various diametrical sizes. As may be seen in FIG. 2, the adapter 10 is initially positioned on the ribs 22 of the conduit 24, with a slight interference fit. In this state, the surface 12 is in compression and the surface 14 is in tension. The conduit 24 is further reinforced by a series of circumferential ribs 26 between the ribs 22.

When the conduit 24 arrives at the job site and is to be installed in a fluidtight relationship with a portal opening, the adapter 10 is positioned for sealing engagement with a gasket in the following manner.

Referring now to FIG. 3, one end 30 of the adapter 10 is grasped and pulled radially and axially in the direction of the arrow so that the adapter 10 inverts itself to assume the position illustrated in dotted outline in FIG. 3 and as illustrated in FIG. 1. In this position, the adapter 10 provides the cylindrical surface 12 on the outside of the adapter. The semitoroidal projections 16 occupy the spaces between the conduit ribs 22 and the cylindrical spaces 18 press tightly on the ends of the ribs 22 to provide a plurality of sealing surfaces at the interface between the adapter 10 and the conduit 24. The adapter 10 should be positioned on the conduit 24 in a location which will permit the adapter 10 to be finally located after inversion at its final sealing location on the conduit 24, since it would be difficult to reposition the adapter after it is locked in place. Such repositioning would thus be accomplished by reinverting the adapter 10 and sliding the surface 12 on the ribs until a proper preinversion position is attained.

Figure 4:
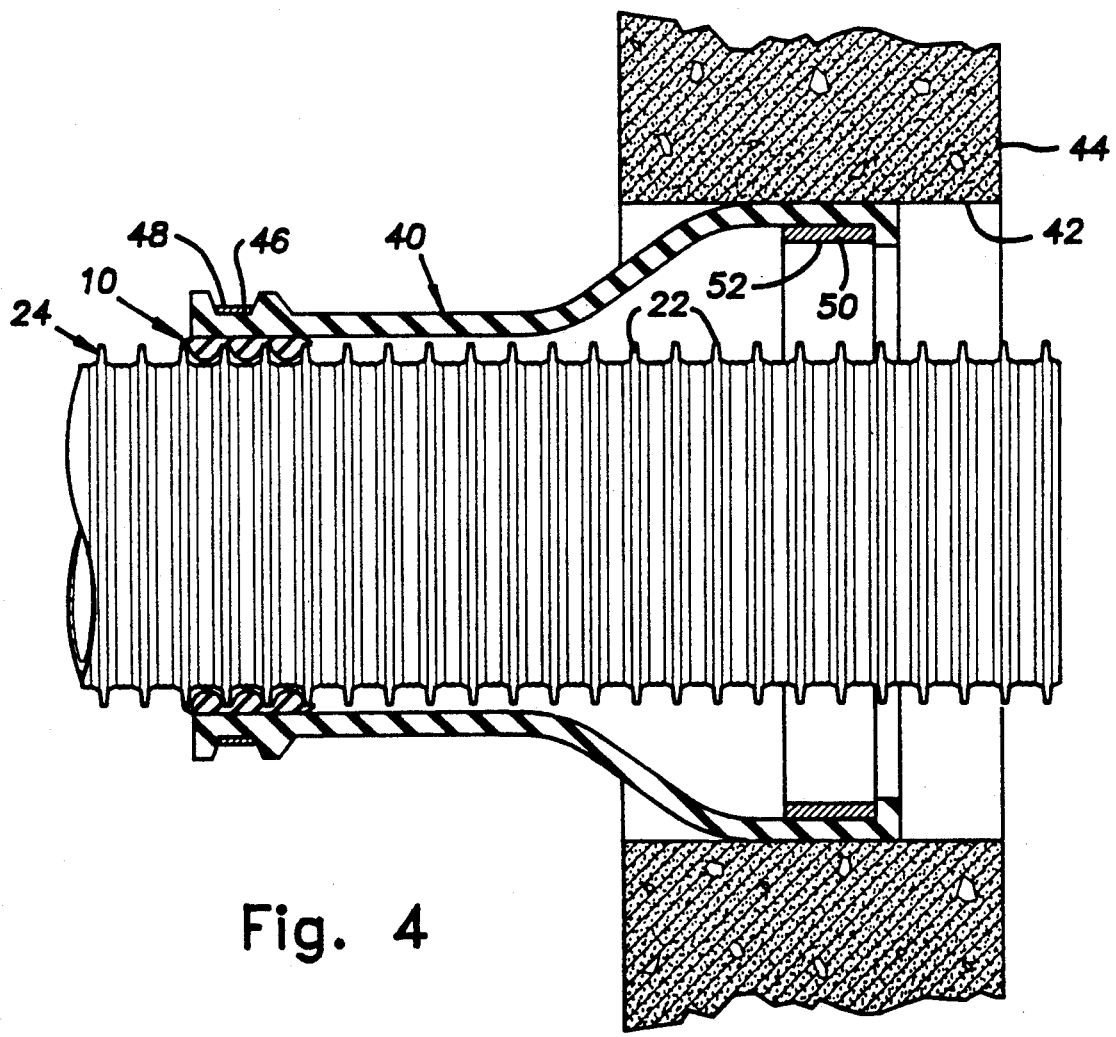
FIG. 4 is a cross-sectional view of a gasket adapter according to this invention illustrating the adapter in use with one type of seal between a conduit and a manhole.

One application of the adapter is illustrated in FIG. 4. Referring to that figure, a pipe-to-manhole seal is illustrated wherein the pipe-to-manhole seal includes a radially expandable locking sleeve 40 which is adapted to form a seal between a pipe receiving opening 42 in a reinforced concrete manhole 44. The seal illustrated in FIG. 4 is set forth in more detail in U.S. Pat. No. 4,478,437, the disclosure of which is incorporated herein by reference. The sleeve 40 is a resilient, elastomeric material, such as rubber, neoprene, or suitable plastic, and is provided at one end with at least one annular groove 46 for receiving a conventional screw-type, annular clamping band 48, as disclosed in U.S. Pat. No. 4,242,164. The other end of the gasket 40 is provided with an internal cylindrical seat 50. The conduit 24, having the adapter 10 in place thereon, is received through the gasket 40, and the clamping band 48 is tightened to provide a seal between the inner surface of the gasket and the cylindrical surface 12 of the adapter 10. A sealing surface is also provided between the annular spaces 18 and the ribs 22. A radially expandable split sleeve 52 is coaxially received within the gasket 40 and, more particularly, within the cylindrical seat 50, and the sleeve 52 is expanded radially to sealingly compress the gasket against the wall of the opening 42, as shown.

Figure 5:
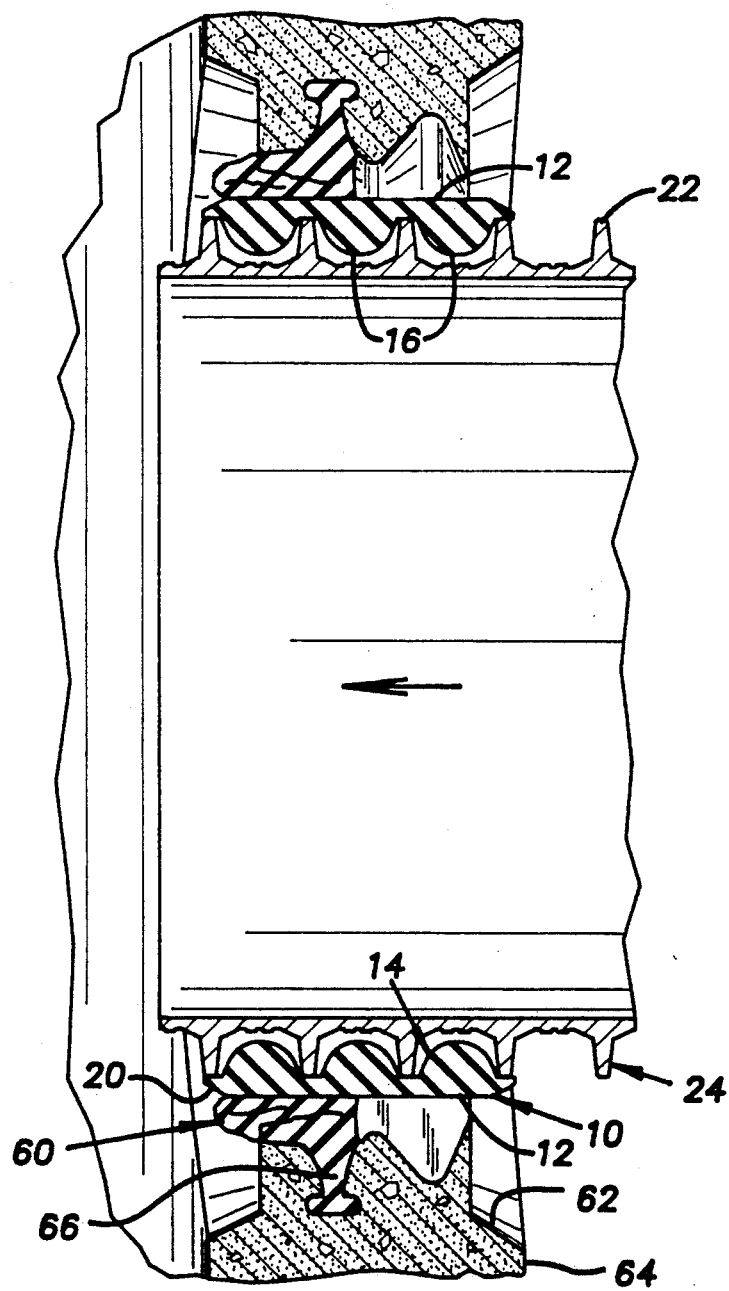
FIG. 5 is an illustration similar to FIG. 4, but showing the adapter in use with another form of seal.

Another pipe-to-manhole seal arrangement is shown in FIG. 5. The particular seal illustrated is a "jab-joint" or interference fit manhole connector of the type disclosed in U.S. Pat. No. 4,809,994, the subject matter of which is incorporated herein by reference. The pipe-to-manhole seal illustrated in FIG. 5 comprises a circular gasket 60 which provides a fluidtight joint between an opening 62 in a cylindrical manhole riser 64 and the conduit 24. The gasket 60 is provided with a generally T-shaped anchoring projection 66 which is cast in place in the manhole riser to securely anchor the gasket 60 therein. The conduit 24, with the gasket adapter 10 properly mounted thereon, is axially inserted into the opening 62 in the direction of the arrow so that the gasket 60 engages the cylindrical surface 12 of the adapter 10. The beveled edge 20 on the adapter facilitates the insertion.

Figure 6:
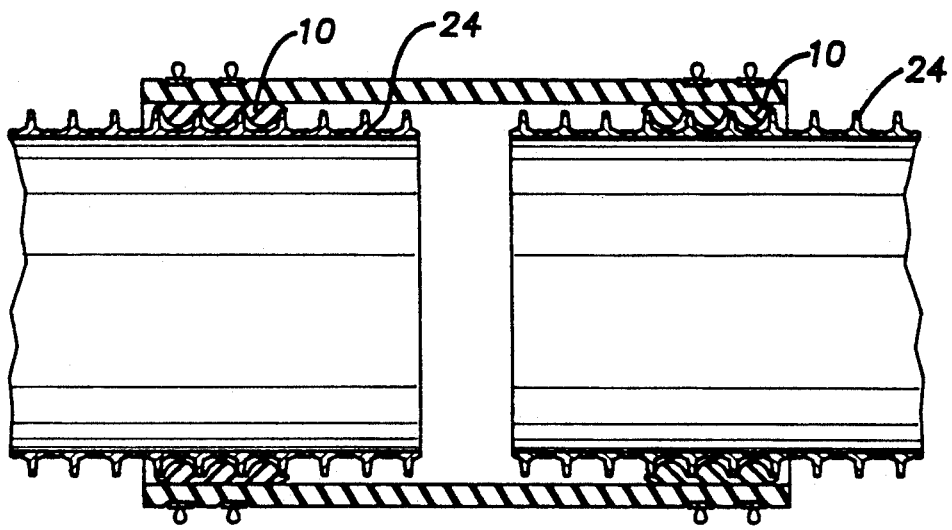
FIG. 6 is a cross-sectional view of a gasket adapter according to this invention illustrating the adapter in use with a splice connector to join ribbed pipes in an end-to-end fashion.

A further use of the adapter 10 is illustrated in FIG. 6. An adapter 10 is positioned on each facing end of aligned conduits 24. A flexible elastomeric sleeve or splice coupler 70 is positioned over each adapter 10 and is clamped thereon by conventional screw-type annular clamping bands 72.

Figure 7:
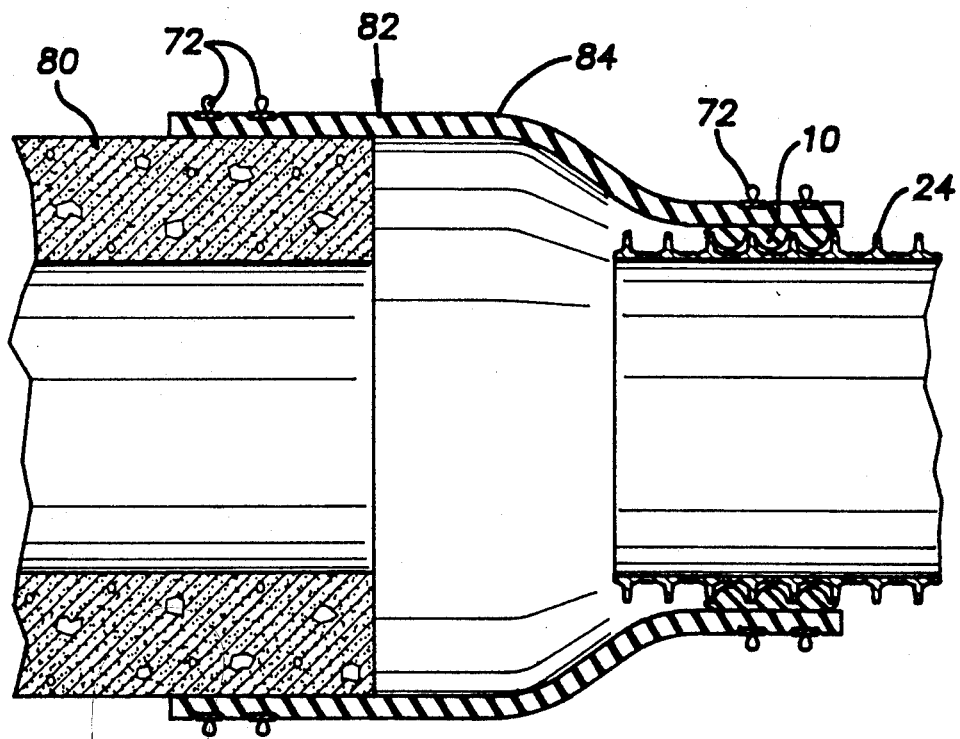
FIG. 7 is a cross-sectional view similar to FIG. 6, but showing the adapter in use in a splice connection between a ribbed pipe and a concrete pipe.

A still further use of the adapter 10 is illustrated in FIG. 7 for joining a ribbed conduit 24 to a concrete pipe 80. A preformed elastomeric sleeve 82 having an enlarged end portion 84 is positioned on the pipe 80 and one end of the conduit 24. Conventional screw-type clamping bands 72 apply clamping pressure to the pipe 80 and the adapter 10.

Although the preferred embodiment of this invention has been shown and described, it should be understood that various modifications and rearrangements of the parts may be resorted to without departing from the scope of the invention as disclosed and claimed herein.

What is claimed is:

1. A method of installing a gasket adapter on a conduit comprising the steps of providing a conduit having a surface characterized by a multiplicity of peaks and valleys, providing a gasket adapter having a smooth, cylindrical inner surface, and an outer surface having a plurality of peaks and valleys substantially complementary to the shape of the peaks and valleys of the conduit, the inside diameter of said adapter being slightly less than the outside diameter of the peaks of said conduit, axially inserting said gasket adapter on said conduit so that the smooth, cylindrical surface tightly embraces the peaks of said conduit, inverting said gasket adapter by axially and radially pulling one end of said gasket adapter until the adapter is turned insideout with the peaks of said adapter entering the valleys of said conduit and with the cylindrical valley portions of said adapter tightly embracing the peaks of said conduit.

* * * * *